(12) United States Patent
Boyle

(10) Patent No.: US 11,236,477 B2
(45) Date of Patent: Feb. 1, 2022

(54) VEHICLE FOR REMOVING FOREIGN OBJECTS

(71) Applicant: Norman Boyle, Merimbula (AU)

(72) Inventor: Norman Boyle, Merimbula (AU)

( * ) Notice: Subject to any disclaimer, the term of this patent is extended or adjusted under 35 U.S.C. 154(b) by 0 days.

(21) Appl. No.: 16/314,164

(22) PCT Filed: Jul. 6, 2017

(86) PCT No.: PCT/AU2017/050698
§ 371 (c)(1),
(2) Date: Dec. 28, 2018

(87) PCT Pub. No.: WO2018/006130
PCT Pub. Date: Jan. 11, 2018

(65) Prior Publication Data
US 2020/0232174 A1  Jul. 23, 2020

(30) Foreign Application Priority Data

Jul. 6, 2016 (AU) .................................. 2016902658

(51) Int. Cl.
*E01H 1/00* (2006.01)
*B60P 1/54* (2006.01)
(Continued)

(52) U.S. Cl.
CPC ............ *E01H 1/003* (2013.01); *B60P 1/5428* (2013.01); *B60R 11/04* (2013.01); *B62D 53/00* (2013.01);
(Continued)

(58) Field of Classification Search
CPC ......... E01H 1/003; E01H 1/00; B60P 1/5428; B60R 11/04; B62D 53/00; B65F 3/0203;
(Continued)

(56) References Cited

U.S. PATENT DOCUMENTS 3,730,367 A      5/1973  Heffington
5,190,400 A  *  3/1993  Sterner .................. E01C 19/16
                                                                    404/103
(Continued)

FOREIGN PATENT DOCUMENTS

DE            1255569 B        11/1967
DE            8707111 U1        7/1987
(Continued)

OTHER PUBLICATIONS

Extended European Search Report for European Application No. 17823344.1.
(Continued)

*Primary Examiner* — Glenn F Myers
(74) *Attorney, Agent, or Firm* — JCIP; Joseph G. Chu; Jeremy I. Maynard

(57) ABSTRACT

Disclosed herein is a vehicle for removing foreign objects (e.g. rubbish) from an area proximal to the vehicle (e.g. along a roadside). The vehicle comprises an arm that is moveable into a foreign object collecting position, a foreign object collector located at a distal end of the arm and configured for collecting foreign objects, and a conduit for conveying collected foreign objects to a storage bin.

16 Claims, 5 Drawing Sheets

(51) Int. Cl.
*B60R 11/04* (2006.01)
*B62D 53/00* (2006.01)
*B65F 3/02* (2006.01)
*G06K 9/00* (2006.01)

(52) U.S. Cl.
CPC ........ *B65F 3/0203* (2013.01); *G06K 9/00791* (2013.01); *B65F 2003/0276* (2013.01); *B65F 2210/168* (2013.01)

(58) Field of Classification Search
CPC ........ B65F 2003/0276; B65F 2210/168; B65F 2210/138; B65F 2210/124; G06K 9/00791; B25J 5/007; B25J 5/005; B25J 9/0084
See application file for complete search history.

(56) References Cited

U.S. PATENT DOCUMENTS

| | | | |
|---|---|---|---|
| 5,222,853 A | 6/1993 | Carson | |
| 5,769,594 A | 6/1998 | Kalua | |
| 6,174,126 B1 * | 1/2001 | Zanzig | B65F 3/00 414/408 |
| 6,604,353 B1 * | 8/2003 | Johnson | A01D 41/1208 56/228 |
| 8,573,914 B1 | 11/2013 | Strange | |
| 8,684,437 B1 * | 4/2014 | Collins | B65F 3/001 296/24.3 |
| 8,998,555 B1 * | 4/2015 | Ingham | B65F 1/1468 414/408 |
| 9,573,169 B2 * | 2/2017 | Huertas | B08B 3/024 |
| 2005/0232736 A1 * | 10/2005 | Fellows | B65F 1/02 414/487 |
| 2006/0061481 A1 | 3/2006 | Kurple et al. | |
| 2006/0280582 A1 * | 12/2006 | Kouri | B65F 3/201 414/408 |
| 2011/0180104 A1 * | 7/2011 | Riach | G01C 21/3469 134/6 |
| 2014/0236446 A1 | 8/2014 | Spence | |
| 2015/0210470 A1 * | 7/2015 | Melloul | B65F 1/125 405/129.6 |

FOREIGN PATENT DOCUMENTS

| | | |
|---|---|---|
| DE | 4021549 A1 | 1/1992 |
| DE | 10027453 A1 | 12/2001 |
| EP | 1020375 A1 | 7/2000 |
| FR | 2764617 A1 | 12/1998 |

OTHER PUBLICATIONS

International Search Report and Written Opinion of International Application No. PCT/AU2017/050698.
International Type—Search Report of Australian Patent Application 2016902658.

* cited by examiner

VEHICLE FOR REMOVING FOREIGN OBJECTS

TECHNICAL FIELD

The present invention relates to a vehicle for removing foreign objects from an area proximal to the vehicle. In a preferred form, the vehicle collects and removes rubbish from a roadside.

BACKGROUND ART

Removing foreign objects such as rubbish/litter from places such as the sides of roads is a continual task. Such rubbish is unsightly, can be environmentally damaging (e.g. when swept into waterways) and potentially even cause traffic accidents. Presently, rubbish removal from the sides of roads is performed by teams of workers by hand, which is an arduous and potentially dangerous process.

Roadsides are inherently dangerous places for workers. Oncoming and passing traffic is the most obvious concern, but other dangers include snakes and other animals as well as uneven ground surfaces, which might cause a worker to trip over and injure themselves. Long term exposure to the elements is also of concern for workers' health.

Such rubbish removal also typically requires the involvement of many workers, including not only those who actually pick up the rubbish and place it into bags, but also a support team that would usually follow behind to provide necessities, collect filled bags of rubbish and provide a warning to motorists.

It would be advantageous to improve the efficiency and reduce the risks associated with the collection of foreign objects such as rubbish from locations such as roadsides.

SUMMARY OF INVENTION

The present invention relates generally to vehicles that can collect and remove foreign objects (e.g. rubbish) from an area proximal to the vehicle (e.g. whilst being driven along a roadside).

In a first aspect, the present invention provides a vehicle for removing foreign objects from an area proximal to the vehicle. The vehicle comprises an arm that is moveable into a foreign object collecting position, a foreign object collector located at a distal end of the arm and configured for collecting foreign objects, and a conduit for conveying collected foreign objects to a storage bin.

The present invention provides a vehicle capable of collecting (e.g. by picking up) foreign objects such as rubbish (e.g. roadside litter) from around the vehicle, and subsequently transferring the foreign objects to an associated storage bin. As would be appreciated, such a vehicle may only require one operator, who would typically be inside a cabin of the vehicle and therefore not exposed to many of the dangers inherent to a roadside. The present invention therefore has the potential to vastly increase workers' safety, to reduce the number of workers and vehicles required to collect roadside litter, and generally speed up the process. The vehicles of the present invention might also decrease the overall maintenance costs and reduce the infrastructure requirements associated with roadside maintenance, as well as freeing up personnel for other, less dangerous, tasks.

In some embodiments, the vehicle may further comprise an arm control system, with movement of the arm being controlled by an operator of the vehicle (e.g. using a joystick or the like, as will be described in further detail below).

Alternatively (or in addition), the vehicle may, in some embodiments, further comprise a foreign object locating system for mapping a location of foreign objects in the area proximal to the vehicle. The foreign object locating system may, for example, comprise one or more cameras for recording a digital image of the area proximal to the vehicle and an image analyser for identifying foreign objects in the digital image. In some embodiments, for example, the image analyser may comprise image recognition to recognise one or both of: predefined foreign objects, and predefined objects which are expected to be found in the area proximal to the vehicle. Such foreign object recognition may help to even further increase the efficiency of the foreign object collection and removal.

Movement of the arm may, in such embodiments, be automatically controlled by the foreign object locating system. Such an automated system may help to even further improve the speed at which foreign objects around the vehicle can be collected, meaning that even greater distances may be covered each day.

In some embodiments, the arm may be slidably coupled to the vehicle. In some embodiments, the arm may be rotatably coupled to the vehicle. In some embodiments, the arm may be located at a front of the vehicle and adapted to collect foreign objects from an area proximal to the front of the vehicle (as will be described in further detail below). In some embodiments, the arm may comprise a plurality of articulated members (e.g. a boom arm and a dipper arm).

In some embodiments, the foreign object collector may comprise one or more foreign object collecting members, each foreign object collecting member being configured for collecting different foreign objects. In some embodiments, for example, the foreign object collector may comprise foreign object clamping members that are configured to clamp and retain foreign objects therebetween.

As would be appreciated, such configurations can provide an extensive range of movement for the arm as well as an appropriate foreign object collector, thereby enabling the collector to collect variously shaped foreign objects spread far and wide. The dexterity of the arm and foreign object collector of such embodiments of the present invention is, to the best of the inventor's knowledge, unmatched in the art.

In some embodiments, the arm may be configured to move between the foreign object collecting position and a foreign object disposing position. In such embodiments, the vehicle may further comprise a receptacle configured to receive foreign objects dropped by the foreign object collector when the arm is in its foreign object disposing position. In some embodiments, the receptacle may be at the front of the vehicle (e.g. centrally located at the front of the vehicle). In some embodiments, the receptacle may comprise a hopper.

In embodiments where the vehicle has a receptacle, the conduit may comprise a conveyor for conveying the foreign objects from the receptacle to the storage bin. In some embodiments, the conduit may be located underneath the vehicle, in a location that will not increase the vehicle's footprint (especially its width).

Alternatively, in some embodiments, the conduit may be provided in other forms, such as, for example, a tube into which foreign objects can be sucked using a vacuum or the like. In such embodiments, an open end of the conduit may be provided as (or as part of) the foreign object collector such that, when the arm is moved into its foreign object collecting position, the foreign object is sucked into and conveyed through the conduit and then expelled into the storage bin.

In some embodiments, the vehicle may further comprise a second arm that is moveable between a foreign object collecting position and a foreign object disposing position. When the second arm is in its foreign object disposing position, foreign objects dropped by the second arm may be received at an inlet of the storage bin (or received at an open end of the conduit, from where they are immediately conveyed into the storage bin). The second arm would typically be located at an opposite side of the vehicle to the arm (e.g. at the rear of the vehicle, if the arm is at the front of the vehicle).

In some embodiments, the storage bin may be defined by or provided in the form of a container on a trailer adapted to be towed behind the vehicle. In some embodiments, the storage bin may comprise a compacting mechanism for compacting foreign objects (e.g. rubbish) contained therein. In some embodiments, the storage bin may comprise a tail gate which is openable to discharge foreign objects (e.g. rubbish) contained therein.

In a second aspect, the present invention provides a vehicle for removing foreign objects from an area proximal to the vehicle. The vehicle comprises an arm that is moveable between a foreign object collecting position and a foreign object disposing position, a foreign object collector located at a distal end of the arm and configured for collecting foreign objects, a receptacle configured to receive foreign objects dropped by the foreign object collector when the arm is in the foreign object disposing position, and a conduit for conveying foreign objects received by the receptacle to a storage bin.

In a third aspect, the present invention provides a vehicle for removing foreign objects from an area proximal to the vehicle. The vehicle comprises an arm located at a front of the vehicle and which is moveable between a foreign object collecting position and a foreign object disposing position, a foreign object collector located at a distal end of the arm and configured for collecting foreign objects, a receptacle located at the front of the vehicle and configured to receive foreign objects dropped by the foreign object collector when the arm is in the foreign object disposing position, and a conduit located underneath the vehicle and configured to convey foreign objects received by the receptacle to a storage bin being towed by the vehicle.

The present invention may also be provided as a kit of parts for attachment to a suitable vehicle, where the resultant vehicle is capable of removing foreign objects from an area proximal to the vehicle. Accordingly, in a fourth aspect, the present invention provides a kit comprising an arm adapted to be attached to a vehicle, whereby the arm is moveable into a foreign object collecting position for collecting a foreign object, a foreign object collector located at a distal end of the arm and configured for collecting foreign objects, and a conduit adapted to be attached to the vehicle, whereby foreign objects collected by the collector are conveyable to a storage bin.

In a fifth aspect, the present invention provides a kit comprising an arm adapted to be attached to a vehicle, whereby the arm is moveable between a foreign object collecting position and a foreign object disposing position, a foreign object collector located at a distal end of the arm and configured for collecting foreign objects, a receptacle adapted to be attached to the vehicle, whereby the receptacle is configured to receive foreign objects dropped by the foreign object collector when the arm is in the foreign object disposing position, and a conduit adapted to be attached to the vehicle, whereby foreign objects received by the receptacle are conveyable to a storage bin.

In a sixth aspect, the present invention provides a trailer adapted to be towed behind the vehicle of the first, second or third aspect of the present invention. The trailer comprises an inlet (i.e. a foreign object receiving portion), adapted to receive foreign objects conveyed by the conduit, and a storage portion for storing the foreign objects. The trailer of the sixth aspect may, for example, define the storage bin of the first, second or third aspect.

Additional features and advantages of the vehicles, kits and trailer of the present invention will be described below in the context of specific embodiments. It is to be appreciated, however, that such additional features may have a more general applicability in the present invention than that described in the context of these specific embodiments.

BRIEF DESCRIPTION OF DRAWINGS

Embodiments of the present invention will be described in further detail below with reference to the following drawings, in which.

DESCRIPTION OF EMBODIMENTS

Figure 1:
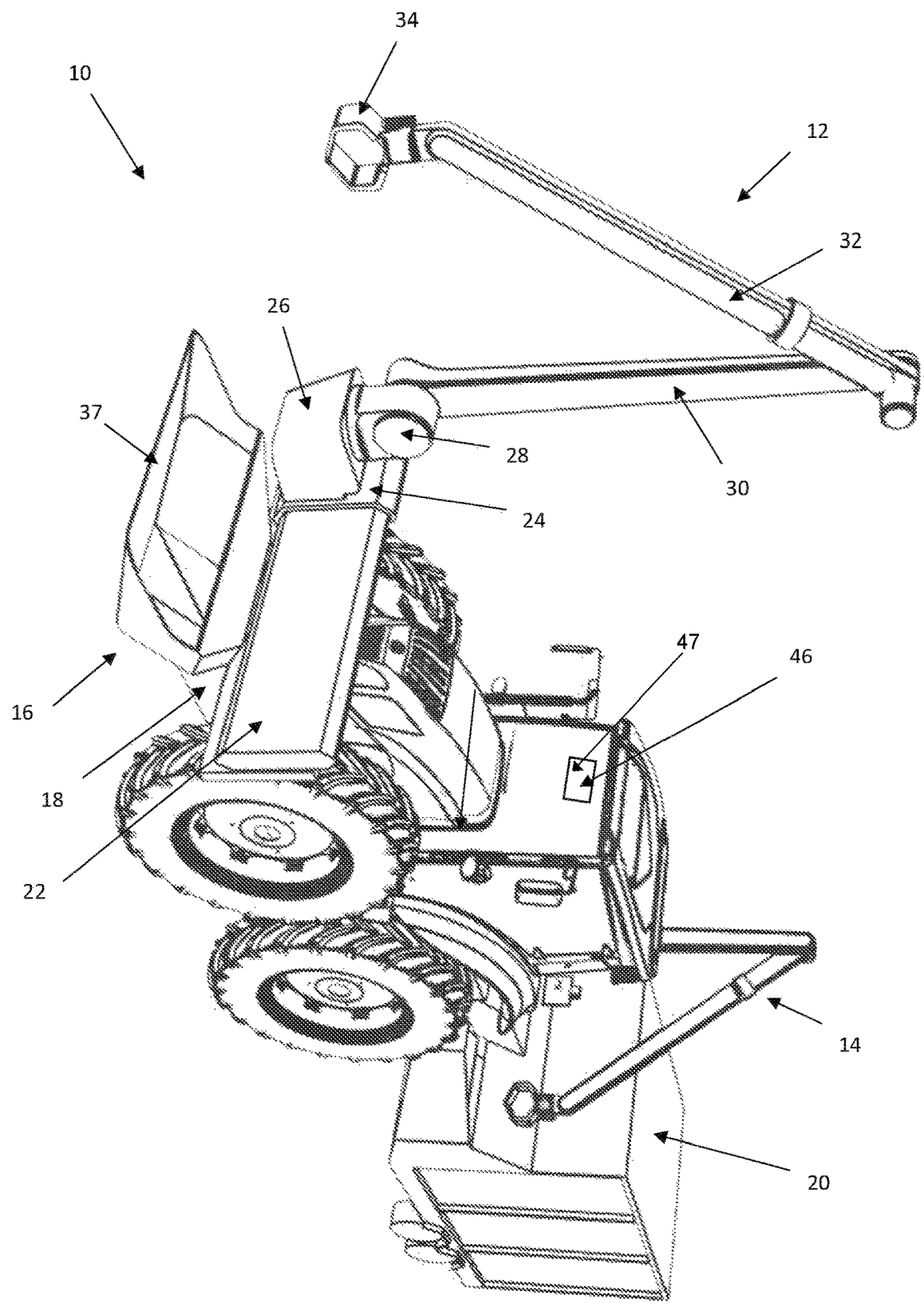
FIG. 1 shows a perspective view of a vehicle in accordance with an embodiment of the present invention with a storage bin being towed behind it.
Figure 2:
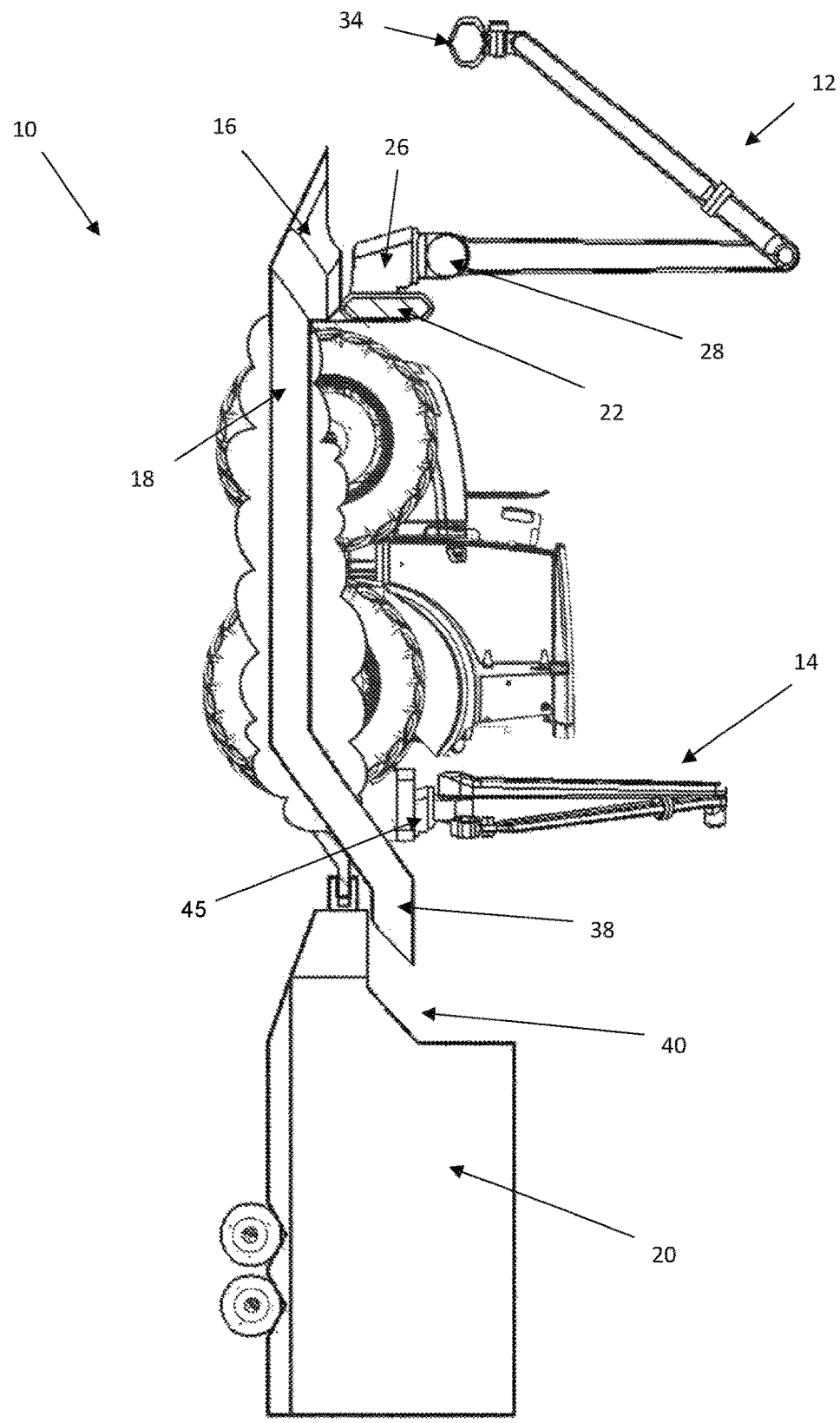
FIG. 2 shows a side, partially cut away, view of the vehicle and storage bin of FIG. 1.

The present invention provides vehicles for removing foreign objects from an area proximal to the vehicle.

In a first aspect, the vehicle comprises an arm that is moveable into a foreign object collecting position, a foreign object collector located at a distal end of the arm and configured for collecting foreign objects, and a conduit for conveying collected foreign objects to a storage bin.

In a second aspect, the vehicle comprises an arm that is moveable between a foreign object collecting position and a foreign object disposing position, a foreign object collector located at a distal end of the arm and configured for collecting foreign objects, a receptacle configured to receive foreign objects dropped by the foreign object collector when the arm is in the foreign object disposing position, and a conduit for conveying foreign objects received by the receptacle to a storage bin.

In a third aspect, the vehicle comprises an arm located at a front of the vehicle and which is moveable between a foreign object collecting position and a foreign object disposing position, a foreign object collector located at a distal end of the arm and configured for collecting foreign objects, a receptacle located at the front of the vehicle and configured to receive foreign objects dropped by the foreign object collector when the arm is in the foreign object disposing position, and a conduit located underneath the vehicle and configured to convey foreign objects received by the receptacle to a storage bin being towed by the vehicle.

As used herein and in the context of the present invention, the term "foreign objects" is to be understood to mean objects which are foreign to the particular environment in which the vehicle of the present invention is travelling, and which it would be advantageous to remove from that environment. In specific embodiments described in further detail below, the foreign objects take the form of pieces of roadside litter which the occupants of vehicles travelling along the road have thrown out of the vehicle's window, as well as other types of rubbish. In such embodiments, foreign objects may, for example, include plastic bottles, cans, take away food wrapping, tyres and tyre fragments and components which have fallen off cars (e.g. bumper bars, following an accident). However, depending on the application, foreign objects may also include objects such as unwanted roadside vegetation (e.g. bushes or small trees) which could be pulled out by the foreign object collector. Foreign objects may also include objects such as rocks which have fallen from an embankment beside a road and which, if not removed, might present a danger to motorists.

Each of the features of the foreign object collecting vehicles of the present invention will be described below.

Any vehicle may be used in the present invention, provided that it is capable of operably carrying the arm and conduit (etc.). Suitable vehicles include utility vehicles, tractors, bulldozers, excavators, and the like. Given the purpose of the vehicle and nature of the components it will need to carry, it is envisaged that the most appropriate vehicle would be a tractor, and preferably a tractor with high ground clearance. The vehicle for use in the present invention may have any standard features or components generally provided with such vehicles, along with any additional components that may be required in order to operate the arm etc. in accordance with the present invention.

The vehicles of the present invention have an arm that is moveable into a foreign object collecting position (so that the foreign object collector, described below, can collect a foreign object). In some embodiments, typically those in which the vehicle also has a receptacle configured to receive foreign objects disposed by the arm's foreign object collector (described in further detail below), the arm may be moveable between the foreign object collecting position and a foreign object disposing position.

The range of movement and distance from the vehicle that the arm can reach (which will define the area proximal to the vehicle from which foreign objects can be collected), as well as the maximum weight of the foreign objects that it can pick up, will depend on the structure of the arm (described in further detail below). However, it is to be appreciated that the arm would usually be moveable into positions where it can collect foreign objects located anywhere within the area proximal to the vehicle. Such foreign objects would typically be located on the ground, but might also be located in other, harder to reach, places such as on embankments or within bushes. In embodiments where the foreign object is too heavy to be lifted by the arm, the arm might instead be used to drag the object closer to the vehicle, for subsequent collection in the manner described below.

The arm may be operated in any suitable manner. In its simplest form, the vehicle may have an arm control system such that movement of the arm (and operation of the foreign object collector) can be controlled by an operator of the vehicle (for example, by using a joystick or other suitable control mechanism) from the cabin of the vehicle. Such arm control systems are known and can be found on currently available machinery. However, efficiency of foreign object collection might be increased if some or all of the arm's movement was automatically controlled. Accordingly, in some embodiments, for example, the arm may be manually moveable (i.e. by the operator) into a foreign object collecting position, but then automatically moved back to a predefined position, such as the foreign object disposing position, by an appropriate arm control system. In other embodiments (described below), movement of the arm may be completely automatic, with the operator only needing to drive the vehicle and operate the arm manually in the event of a piece of rubbish being missed.

In some embodiments, a foreign object locating system for mapping the location of foreign objects in the area proximal to the vehicle may be provided. The foreign object locating system may be used to automatically control movement of the arm, in particular into its foreign object collecting position (the foreign object disposing position being more likely to be in a predefined location).

Such a foreign object locating system would typically include one or more cameras (e.g. two cameras could be used to provide a stereoscopic view, which may also help with image recognition) mounted in positions where they are able to view the entirety of the area proximal to the vehicle from which foreign objects are to be collected (e.g. the vehicle's front window). The cameras are operable to record a digital image of the area proximal to the vehicle, with an image analyser being used to analyse the digital image(s) in order to identify foreign objects in the image (i.e. in the area proximal to the vehicle). Data from these cameras could be analysed to identify foreign objects within the area and allocate a location to them for subsequent collection. Factors such as any movement of the vehicle can also be taken into account when moving the arm to pick up the foreign object.

The image analyser may use image recognition to recognise objects which appear in the image. These objects may either be foreign objects (i.e. those needing to be removed) or "native" objects (i.e. those which would be expected to be found in the area proximal to the vehicle and which are not to be removed).

Image recognition is a reasonably well-developed technique. Briefly, image recognition can be used to identify objects present in a digital image by analysing the image using various techniques and comparing the results of that analysis with a database of images of known objects. Image recognition techniques may involve an image recognition stage comprising edge shape detection (optionally with rotation invariance processing to allow for edge shape detection of skewed objects). Edge shape detection may involve comparison to reference shapes in a shape reference database. Alternatively (or in addition), image recognition may comprise an image recognition stage comprising colour detection (e.g. colour juxtapose detection). Colour detection may involve comparison to reference colours in a colour reference database. Alternatively (or in addition), image recognition may involve an image recognition stage comprising symbol detection. Symbol detection may involve comparison to reference symbols in a symbol reference database, including alphanumeric symbol detection and text recognition. Such recognition stages may be used to identify objects which would typically be found in the area of operation. Appropriate computer hardware and software would be provided with the vehicle for processing the digital images recorded by the camera(s) in order to identify foreign objects and otherwise operate the foreign object locating system.

Image recognition may, for example, be used to identify objects of the type that would be expected to be found in the relevant location (e.g. on the side of a road), such as rocks, sticks, guard rails, fence posts, indicator posts, signage, etc., with objects that are not recognised being classified as foreign. In such embodiments, the image recognition may be carried out using an image processing technique where the digital image from the one or more cameras is digitally compared (e.g. as described above) with images stored in an accessible database of such objects.

The image recognition may also be used to identify foreign objects having a distinctive shape and which are commonly found on roadsides (e.g. drink bottles, take away containers, etc.). Foreign object recognition may also provide useful data for the subsequent collection of the foreign object, such as its likely weight, compressibility, etc., which may influence the manner in which the object is collected. For example, heavy foreign objects such as tyres may be categorised as likely having a weight that the arm may struggle to lift, and hence the arm be caused to drag the tyre towards the vehicle (for manual collection or, more typically, collection by the second arm, in embodiments where such is present) instead of trying to lift it. This data may also influence the choice of foreign object collecting member (described below), in embodiments where multiple collecting members are present.

A user (i.e. the driver of the vehicle) may have a selectable degree of control over normal operation of the foreign object locating system, depending on factors such as the amount and type of foreign objects requiring collection and the nature of the terrain over which the vehicle is travelling. For example, in environments where foreign objects are highly visually distinguishable from the surrounding environment, then little user interaction may be required. However, in other environments (e.g. where roadside litter may be hidden in relatively long grass), the user may need to inform the system of foreign objects not identified or provide confirmations to the system regarding whether or not a particular object is foreign (and thus needs to be collected).

A default operation of the system may, for example, be that the user is prompted to confirm whether each object tentatively identified by the foreign object locating system as a foreign object requires collection. Another operation of the system may require the user to only deselect any non-foreign objects identified by the system, with deselected objects not being automatically collected. In all operations, the user should be able to override the system in order to identify objects that need to be collected, for example, in circumstances where rocks (which might have been categorised an non-foreign objects by the system) have fallen from a roadside embankment and need to be collected lest they present a hazard to subsequent road users.

The vehicle may also include a visual display, on which the user can see the images recorded by the cameras, with the objects classified as foreign objects being highlighted (e.g. within a circle). The user may be presented with an option to override an incorrect categorisation, or to identify foreign objects that were not identified by the foreign object locating system. It is envisaged that personal computing devices such as tablets could be used to perform these functions.

The arm may be associated with the vehicle in any manner that enables it to provide its required functionality, as described herein. The greater the degrees of freedom the arm has to move with respect to the vehicle, the more versatile it will be in picking up foreign objects in the area.

The arm may, for example, be slidably coupled to the vehicle. When coupled to the vehicle in this manner, the arm would be capable of sliding a distance along the front and/or a side of the vehicle, thereby expanding the area that is reachable by the arm. The distance the arm may slide with respect to the vehicle may vary, but would usually extend for as much of the width or length of the vehicle as possible, in order to maximise the area it can reach. Any suitable sliding coupling mechanism may be used.

The arm may, for example, be rotatably coupled to the vehicle. When coupled to the vehicle in this manner, the arm is able to rotate relative to the vehicle, which greatly increases the area it can reach and necessitates less movement of the vehicle in order to reach rubbish. Any suitable rotating mechanism may be used.

The arm may be located at any position on the vehicle, for example, at the front, back or side of the vehicle, depending primarily on where the vehicle is to be used to collect foreign objects. Typically, the arm would be located at a front of the vehicle such that it collects foreign objects from an area in front of the vehicle. In embodiments where the arm has degrees of rotational and/or sliding freedom (as described above) with respect to the vehicle, the area from which foreign objects can be collected may also extend for some distance around the front sides of the vehicle (see, for example, FIG. 3C described below). Having the arm operating in the same direction that the vehicle is moving would mean that an operator would not need to keep turning around in order to look between the direction of travel and the operating arm. As would be appreciated, frequent turning would increase the risk of repetitive-type injuries occurring to operators of vehicles and necessitate the driver to spend periods of time not looking in the direction of travel of the vehicle.

In embodiments, where the vehicle is to be used to collect roadside litter, it may be sufficient for the arm to be rotatably located at the front, right hand side (verge side) of the vehicle, as the area proximal to this corner of the vehicle is the area from which foreign objects are most likely to be located.

The arm itself may have any structure which enables it to move between its respective positions. Typically, the arm would comprise a plurality of articulated members, as is the case for the corresponding arms of many kinds of plant and machinery presently on the market. In some embodiments, for example, the arm may comprise a boom arm and a dipper arm, similar to the arms of backhoes and excavators. The arms may similarly be connected together at pivot points and their relative movement controlled by hydraulic rams or other suitable mechanisms.

The arm (and its component parts) may be formed from any suitable materials. Traditionally, such materials are relatively heavy and durable metallic materials, due to the heavy lifting that the arms are required to perform. In embodiments where the vehicle includes a second arm, however, the arm may advantageously be formed from lighter metallic materials, or even from lightweight non-metallic materials such as carbon fibre. Lighter arms could be operated more quickly and would require less power than that required by a corresponding "heavy" arm. In these embodiments (described below), the heavier lifting can be performed by the second arm, with the first arm only being required to collect smaller foreign objects and, where necessary, drag larger foreign objects towards the vehicle (where they can be accessed by the second arm).

Once the arm is moved into its foreign object collecting position, the foreign object may be collected by the foreign object collector. The foreign object collector may take any form that is capable of collecting (i.e. picking up) foreign objects of the type contemplated by the present invention (e.g. roadside litter ranging in size between tyres and plastic bottles, for example) and may use any suitable means to collect the foreign object. In some embodiments, for example, an open end of the conduit (described in further detail below) may be provided with the foreign object collector positioned at the end of the arm such that, when the arm is moved into its foreign object collecting position, the foreign object is sucked into and conveyed through the conduit and then expelled into the storage bin. Alternatively, a suction may be provided, but sufficient only to retain lighter foreign objects at the end of the arm whilst they are moved elsewhere (e.g. to the foreign object disposing position) for disposal. In some embodiments, the foreign object collector may include a plurality of nozzles, each having an independent suction so that a plurality of foreign objects can be retained by the foreign object collector at the end of the arm (i.e. one foreign object per nozzle).

As would be appreciated, however, many kinds of foreign objects would not be collectable in such a manner. For example, foreign objects that are heavy or have a dimension greater than the conduit would not be able to be collected.

In alternate embodiments, therefore, the foreign object collector may comprise one or more foreign object collecting members, each foreign object collecting member being configured for collecting different foreign objects. For example, the foreign object collector may comprise foreign object clamping members that are configured to clamp and retain foreign objects therebetween. Such clamping members are known in the art of robotics and can be operated (manually or automatically) using known techniques. In embodiments where the image recognition system described above is used, the clamping force applied to the foreign object may take into account the anticipated properties of the recognised object. For example, a strong clamping force would be required to pick up a relatively heavy object whilst a weaker force required for objects such as plastic bottles.

Any other form of foreign object collecting member may be provided, including, for example, a spike for spiking the foreign objects, a magnet for collecting magnetic objects (including perhaps tyre fragments), etc. In some embodiments, a plurality of foreign object collecting members may be provided on the foreign object collector at the end of the vehicle's arm, with the vehicle's operator being able to select the most appropriate member to pick up any given foreign object. Alternatively, the image recognition system described above may be capable of identifying specific foreign objects and, based on that identification, automatically select the most appropriate foreign object collecting member. In some embodiments, on more of the plurality of foreign object collecting members may be moveable between a deployed position, where they can collect foreign objects, and a retracted position, where they are located out of the way.

In some embodiments, the foreign object collector (or the end of the arm proximal to the collector) may include a camera, the feed from which is relayed to the vehicle's driver so that they can more closely observe the foreign object's collection. Such embodiments would probably be more suited to manual operation of the foreign object collector, although the camera may be useful even in an automatic operation because it may enable the driver to more closely observe the entirety of area surrounding the vehicle.

In some embodiments, the vehicles of the present invention may also comprise a receptacle configured to receive foreign objects. The receptacle is located in a position on the vehicle where it can receive foreign objects dropped by the foreign object collector when the arm is in its foreign object disposing position.

A suitable receptacle is one capable of receiving foreign objects having the size, weight and other relevant properties that would be expected to be found in the relevant area. Typically, the receptacle will have a shape which favours the receipt of the foreign objects into the receptacle, for example, a tapered shape where a large opening for receiving rubbish tapers inwardly towards its base. The receptacle may, for example comprise a hopper or a bucket (e.g. similar to those used on front end loaders and the like).

The receptacle may be located anywhere on the vehicle, depending primarily on where the arm is located. For the reasons mentioned above, the receptacle would usually be mounted on the front of the vehicle, where the operator can easily see it and move the arm into a position above it (in manual operation), where releasing collected objects above the receptacle causes them to fall into it. For the reasons described below, the receptacle would usually be centrally located at the front of the vehicle.

The vehicle of the present invention also comprises a conduit for conveying the collected foreign objects (e.g. after being received by the receptacle) to the storage bin. Any conduit through which foreign objects of the type likely to be encountered in the relevant area (e.g. rubbish along a roadside) can be conveyed may be used. Any suitable mechanism may be used to convey the foreign objects through the conduit, including via suction or a conveyor system such as a conveyor belt provided along a floor of the conduit.

In some embodiments, the conduit may directly link the foreign object collector located at the end of the arm and the storage bin (i.e. a foreign object at the foreign object collection position within the area proximal to the vehicle is conveyed directly to the storage bin via the conduit). For example, as noted above, in some embodiments, the conduit may be provided in the form of a tube to which a vacuum is applied and through which foreign objects can be effectively sucked into the storage bin.

Alternatively, the conduit may not be directly linked to the foreign object collector, but may be configured to convey foreign objects to the storage bin from an intermediate location such as, in some embodiments, the receptacle. In embodiments where the vehicle comprises a receptacle, for example, the conduit may comprise a conveyor (e.g. a conveyor belt) for conveying the foreign objects from the receptacle to the storage bin. The receptacle may effectively funnel the dropped foreign objects towards the conveyor and, once thereon, the conveyor conveys the objects to the storage bin.

The conduit may be located at any suitable position on the vehicle, with the most practical position being underneath the vehicle (provided that the vehicle has sufficient clearance above the ground). Locating the conduit underneath the vehicle provides numerous advantages, including that the width of the vehicle is not increased by the conduit (which might classify the vehicle as a wide load and restrict its movement along public roads), nor is it necessary to convey potentially heavy objects upwardly and over the top of the vehicle (which might require more powerful driving motors and more complicated engineering, as well as being potentially dangerous). Further, as will be described below, the storage bin is typically provided on a trailer that is towed behind a vehicle, and a conduit passing underneath the vehicle is therefore well aligned with such a storage bin.

The conduit may, for example, be provided in the form of a sealed chamber suspended from an underside of the vehicle. The conveyor would be located at the floor of the conduit and have ends terminating underneath the receptacle and at an intake of the storage bin. In this manner, foreign objects dropped into the receptacle would be guided by the receptacle's walls onto the end of the conveyor, be conveyed through the conduit, underneath the vehicle, and into the storage bin. Motors to drive the conveyor may be separately provided, or the vehicle may have couplings capable of doing this (e.g. a PTO coupling).

The present invention also provides a storage bin, into which foreign objects collected by the foreign object collector are conveyed. Any container suitable for temporarily storing the foreign objects may be used, bearing in mind the purpose and other components of the invention. The storage bin may, for example, be defined by a container on a trailer adapted to be towed behind the vehicle, which would enable the storage bin to be transported independently of the vehicle (e.g. a full storage bin could be replaced with an empty one so that the vehicle does not have to stop collecting foreign objects such as roadside litter).

The storage bin may have an inlet, via which the foreign objects from the conduit can be received into the bin. This inlet may take any suitable form. Similarly, the storage bin may have an outlet, via which the stored foreign objects can be removed (e.g. at a garbage tip). Again, this outlet may take any suitable form, and may simply be a tail gate that is openable to reveal the inside of the bin and hence discharge rubbish contained therein.

The storage bin may also include a number of features commonly found with rubbish collecting plant and machinery. For example, the bin may comprises a compacting mechanism for compacting foreign objects contained therein. Such a mechanism would increase the carrying capacity of the bin and reduce the volume of material for ultimate discharge into a garbage tip. The storage bin may also have sensors to indicate parameters such as how full it is (and hence how much longer before the bin needs to be emptied) and how heavy the storage bin is (e.g. so as not to exceed an allowable weight).

In some embodiments, the vehicle of the present invention may further comprise a second arm that is moveable between a foreign object collecting position and a foreign object disposing position. When in the foreign object disposing position, foreign objects dropped by the arm are received by an inlet of the storage bin. Such a second arm may have a different (typically greater) carrying capacity than the other arm (i.e. that described above), and may therefore be useful for picking up heavier objects. Further, as the second arm is configured to dispose foreign objects directly into the storage bin, objects that are physically larger than the conduit can still be placed into the storage bin using the vehicle.

The second arm may comprise a foreign object collector that is the same as or different to that of the other arm. Bearing in mind its intended "heavy lifting" purpose, it is envisaged that the second arm would typically comprise a foreign object collector in the form of a clamping member.

The second arm would usually be located at an opposite side of the vehicle to the other arm, in order to provide the greatest amount of versatility. In embodiments where the second arm is intended to pick up heavy and/or bulky items (i.e. that might not fit through the conduit), then the second arm would be at the back of the vehicle and located in a position where it can drop such objects directly into the inlet area of the storage bin (or onto the conveyor, after it has come out of the conduit, in embodiments including such features).

It is envisaged that the second arm be operable in a cooperative manner with the other arm in order to remove substantially all of the foreign objects from the area proximal to the vehicle. In some embodiments, for example, a lightweight front (first) arm may be used for the majority of the collecting, with this arm being operable without the operator having to turn around. However, when a relatively large or heavy foreign object is encountered, the front arm may, if necessary, be used to drag the foreign object closer to the vehicle and into a position where, once the vehicle has advanced, it is able to be collected by the second (rear) arm and deposited directly into the inlet area of the storage bin.

In some embodiments, the vehicle may also include sensors which can sense parameters such as the weight or compressibility of a foreign object when it is first collected by the arm, cameras to record a condition of the roadside (and assets thereat) and/or positioned at the end of the arm for more closely viewing foreign objects, and locating systems to report a location of the vehicle and hence the vehicle's progress.

As noted above, the present invention may instead be provided in the form of a kit of parts for attachment to a suitable vehicle (e.g. a tractor, although any other suitable vehicle may be used) in order to covert the vehicle into one capable of removing foreign objects from an area proximal to the vehicle. One such suitable kit may include:

an arm adapted to be attached to the vehicle, whereby the arm is moveable into a foreign object collecting position for collecting a foreign object;

a foreign object collector located at a distal end of the arm and configured for collecting foreign objects; and a conduit adapted to be attached to the vehicle, whereby foreign objects collected by the collector are conveyable to a storage bin.

Another suitable kit may include:

an arm adapted to be attached to the vehicle, whereby the arm is moveable between a foreign object collecting position and a foreign object disposing position;

a foreign object collector located at a distal end of the arm and configured for collecting foreign objects;

a receptacle adapted to be attached to the vehicle, whereby the receptacle is configured to receive foreign objects dropped by the foreign object collector when the arm is in the foreign object disposing position; and a conduit adapted to be attached to the vehicle, whereby foreign objects received by the receptacle are conveyable to a storage bin.

Arms, receptacles and conduits for inclusion with these kits may be as described above with respect to the vehicles of the present invention. The kit may, in some embodiments also include a storage bin, for example in the form of a trailer and adapted to be towed behind the vehicle. The kits would also include assembly instructions and may also include materials to facilitate the assembly, such as fasteners, etc.

As noted above, the present invention also provides a trailer adapted to be towed behind the vehicle of the present invention. The trailer comprises an inlet adapted to receive foreign objects conveyed by the conduit, and a storage portion for storing the foreign objects.

Specific embodiments of the present invention will now be described with reference to the accompanying drawings. Referring firstly to FIGS. 1 to 4, a vehicle for removing foreign objects from an area proximal to the vehicle is shown in the form of tractor 10 for removing litter from a roadside. Tractor 10 has an arm that is moveable between a foreign object collecting position (see FIGS. 3A and 3B) and a foreign object disposing position (see FIG. 3C), which is shown in the form of front arm 12. Tractor 10 also has a second arm that is moveable between a foreign object collecting position (see FIGS. 4A and 4B) and a foreign object disposing position (see FIGS. 4A and 4B), which is shown in the form of rear arm 14.

Tractor 10 also has a receptacle configured to receive foreign objects disposed by the arm 12 when in its foreign object disposing position, which is shown in the form of hopper 16, and a conduit 18 for conveying foreign objects (not shown) received by the receptacle 16 to a storage bin 20.

Arm 12 is slidably and rotatably coupled to the front of tractor 10. A slider rail 22 is attached to the front of tractor 10, with arm 12 being coupled to the slider rail 22 via a sleeve 24. A rotating member 26 is attached to sleeve 22, such that arm 12 can rotate in a horizontal plane, and a pivoting coupling 28 is attached to rotating member 26 such that arm 12 can also rotate in a vertical plane. Arm 12 has a boom arm 30, a dipper arm 32 and a clamping member 34. Although not shown for clarity, hydraulic rams, rotational motors and the like, would also be present in order to cause respective movements of the components of arm 12.

Figure 3A:
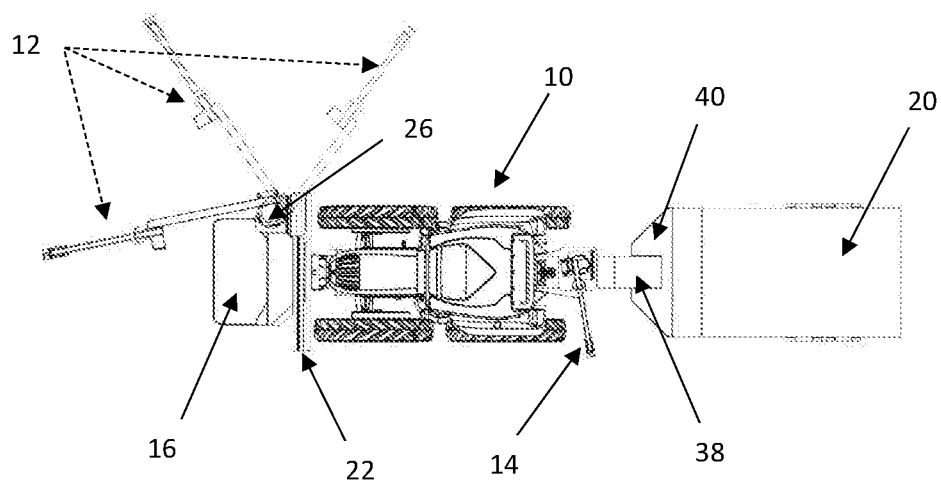
FIG. 3A shows a top view of the vehicle and storage bin of FIG. 1, with the (front) arm extended in a range of foreign object collecting positions to the front right hand side of the vehicle.
Figure 3B:
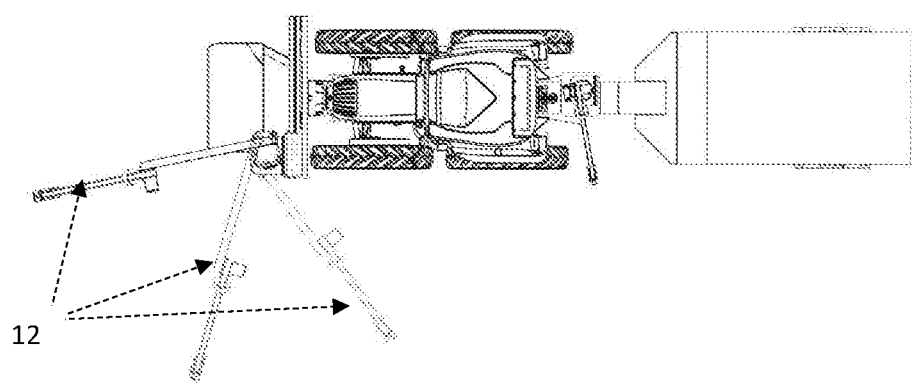
FIG. 3B shows a top view of the vehicle and storage bin of FIG. 1, with the (front) arm extended in a range of foreign object collecting positions to the front left hand side of the vehicle.
Figure 3C:
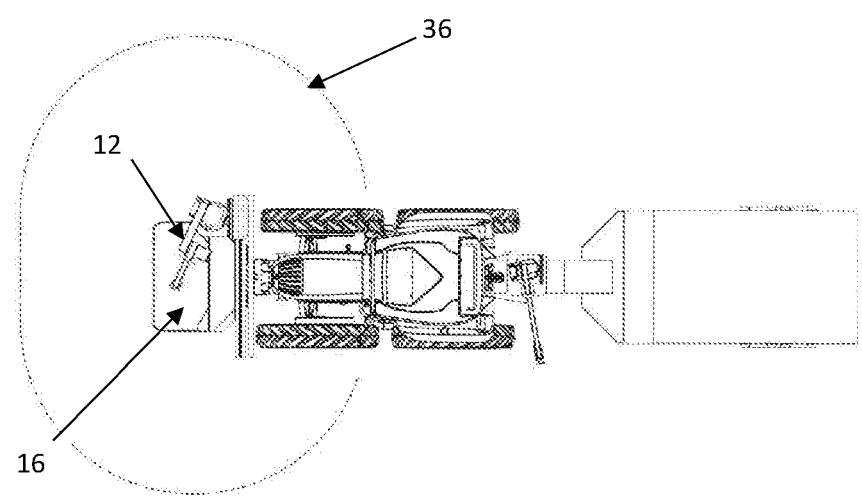
FIG. 3C shows a top view of the vehicle and storage bin of FIG. 1, with the (front) arm in a foreign object disposing position, and with an imaginary line showing the extent of the area proximal to the vehicle which can be reached by the (front) arm.

Referring now to FIGS. 3A, 3B and 3C, in use, arm 12 can slide from a position at the rightmost side of slider rail 22 (as can be seen in FIGS. 1 and 3A) to a leftmost side of slider rail 22 (as can be seen in FIG. 3B). As can be seen from FIGS. 3A and 3B, arm 12 can be rotated about rotating member 26 through an angle of about 270 degrees, with its rotational freedom (in this plane) really only being limited by the physical constraint that it not strike the body of the tractor 10. Arm 12 can also be extended via a pivoting of the pivoting coupling 28 in conjunction with a pivoting movement of the boom 30 and dipper 32 arms (compare FIGS. 3A and 3C). In this manner, foreign objects (e.g. rubbish, not shown) anywhere in the area 36 shown in FIG. 3C is capable of being reached by arm 12 (or, more relevantly, clamping member 34 at the end of arm 12).

Once the arm 12 has moved into its foreign object collecting position (e.g. as shown in FIGS. 3A and 3B), the clamping member 34 can be operated to clamp the foreign object (not shown) between its jaws (not shown in the Figures for clarity). Once the foreign object is clamped between the jaws of clamping member 34, the arm 12 moves back to its foreign object disposing position, as can be seen in FIG. 3C. Once in this position, the jaws of the clamping member 34 can be opened, whereupon the foreign object falls into the hopper 16.

Hopper 16 has a chute 37 (see FIG. 1) which guides objects dropped into the hopper 16 towards the bottom of the hopper 16, where they enter the conduit 18. As can best be seen in FIG. 2 (where a side of the tractor 10 has been cutaway so that the path of the conduit 18, which travels along a centre of the tractor 10, can be seen), conduit 18 is suspended below the chassis of the tractor 10 and extends from the receptacle 16, at the front of the tractor 10, to the trailer 20, being towed behind the tractor 10. A conveyor belt (not shown) at the bottom of conduit 18 conveys objects through conduit 18 between the hopper 16 and the trailer 20. The terminal end 38 (see FIGS. 2 and 4) of the conduit 18 is elevated slightly so that objects falling from the terminal end 38 of conduit 18 fall into an inlet 40 of the trailer 20.

Figure 5A:
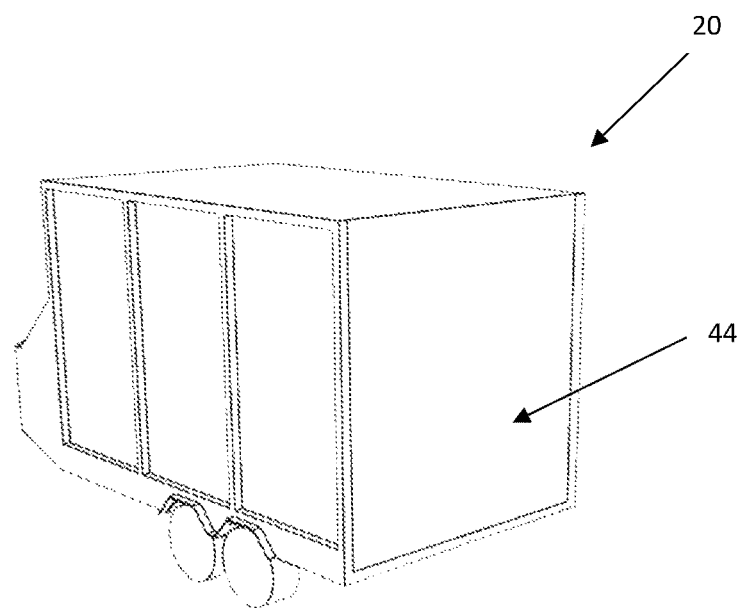
FIG. 5A shows a perspective view of the storage bin of FIG. 1.
Figure 5B:
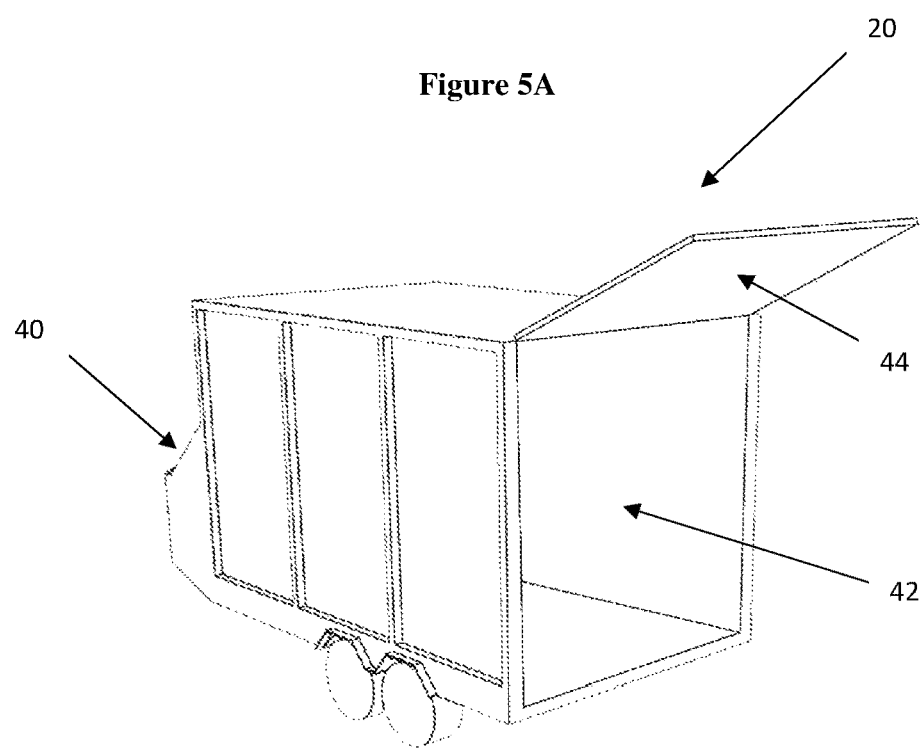
FIG. 5B shows a perspective view of the storage bin of FIG. 5A, with its tail gate in an open position.

Trailer 20 may be towed behind tractor 10 in any conventional manner. In addition to the inlet 40, trailer 20 has a storage compartment 42 (see FIG. 5B) for storing collected rubbish. Trailer 20 also has a tail gate 44, which (as can be seen in FIGS. 5A and 5B) can be opened in order to empty any contents in the storage compartment 42. In use, objects received into inlet 40 are transferred to storage compartment 42 using any suitable mechanism (not shown). Although not shown, this transferal may involve a compaction step, whereby the volume of the collected foreign objects is reduced.

The trailer 20 may be decoupled from tractor 10 when full and then towed by another vehicle to a garbage tip, where its contents can be emptied. Whilst this is occurring, a replacement trailer 20 may be provided so that the tractor 10 does not have to stop collecting rubbish from along the side of the road. In this manner, the tractor 10 can be used to collect rubbish for a much longer period of time than might otherwise be possible.

Figure 4A:
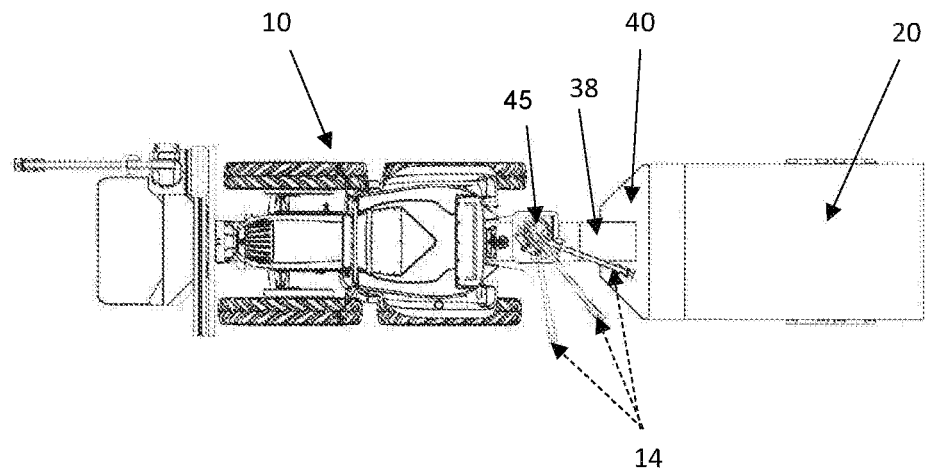
FIG. 4A shows a top view of the vehicle and storage bin of FIG. 1, with the second (rear) arm extended in a range of foreign object collecting positions to the left hand side of the vehicle.
Figure 4B:
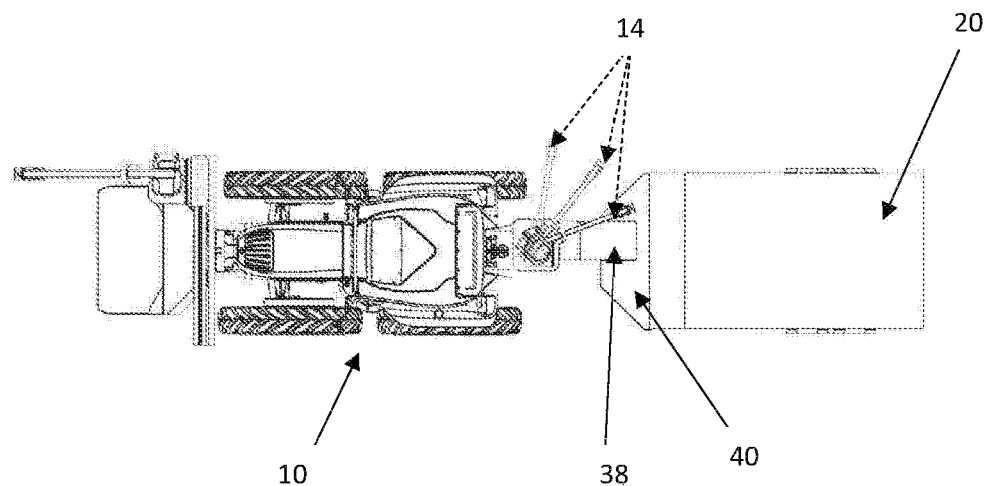
FIG. 4B shows a top view of the vehicle and storage bin of FIG. 1, with the second (rear) arm extended in a range of foreign object collecting positions to the right hand side of the vehicle.

Arm 14 is positioned substantially centrally at the rear of the tractor 10, and is rotatably coupled to the tractor 10 in a manner similar to arm 12 (although, in this embodiment, arm 14 is not slidably coupled to the tractor 10) via coupling 45. The structure of arm 14 is otherwise similar to that of arm 12, and will not be described again here, although the boom and dipper of arm 14 are smaller than those of arm 12 and arm 14 therefore has a greater lifting capacity (with a correspondingly lesser reach) than that of arm 12. FIGS. 4A and 4B depict the ranges of rotational movement which arm 14 is capable of achieving to the left and right hand side of the tractor 10, respectively, with the individual arms of the arm 14 being extendable to collect foreign objects to the side of the rear of tractor 10.

Arm 14 is capable of depositing collected foreign objects (not shown) directly into the inlet 40 of the trailer 20, thereby bypassing the conduit 18. Alternatively, arm 14 can deposit collected foreign objects onto the terminal end 38 of the conduit 18, where they are subsequently conveyed into the inlet 40 of the trailer 20. In this manner, foreign objects that are either too large or too heavy to be received in the hopper 16 and (more relevantly) through the conduit 18 can still be collected using the tractor 10.

Front 12 and rear 14 arms are operable in a cooperative manner to remove substantially all of the foreign objects from the area proximal to the vehicle. As it is operable without requiring the operator to turn around, the front arm 12 does a majority of the collecting. However, when a relatively large or heavy foreign object (not shown) is encountered (e.g. a truck tyre or mattress), the front arm 12 can (if necessary) drag the foreign object closer to the tractor 10 and into a position where, once the tractor 10 has advanced, it is able to be collected by rear arm 14 and deposited directly into the inlet 40 of the storage bin 20.

Vehicle 10 also has a foreign object locating system 47 which includes a camera 46 positioned on the front windscreen of the vehicle (see FIG. 1). Camera 46 records digital images of the area 36, which are processed by an on-board computer system (not shown) using image recognition techniques of the type described above in order to identify foreign objects (or to identify potential foreign objects for the user to confirm) within area 36. The computer system may then utilise this information in the manner described above in order to speed up (or otherwise simplify by automation) the foreign object collection process.

It will be appreciated that the present invention provides a number of new and useful results. For example, specific embodiments of the present invention may provide one or more of the following advantages:

greatly reduced danger to workers involved with the collection of rubbish on road sides;

the vehicle may be continually operated and thereby cover greater distances over the course of the day;

fewer workers are required—indeed, the operation could be carried out with only one or two people;

fewer vehicles are required, with a second vehicle only being needed in the event of the storage bin needing to be emptied whilst rubbish collection continues image recognition can be utilised to even further increase the efficiency of foreign object removal;

the versatility of the foreign object collector located at the end of the (potentially lightweight and rapid moving) enables a great variety of foreign objects to be collected, ranging from plastic bottles (or even smaller objects) to truck tyres, for example; and reduction of maintenance costs due to fewer vehicles operating.

It will be understood to persons skilled in the art of the invention that many modifications may be made without departing from the spirit and scope of the invention. All such modifications are intended to fall within the scope of the following claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A vehicle for removing pieces of roadside litter from an area proximal to the vehicle, the vehicle comprising:
    an arm that is moveable into a position at a piece of roadside litter;
    a collector located at a distal end of the arm and configured to collect the piece of roadside litter;
    an arm control system whereby movement of the arm to respective pieces of roadside litter is controllable by an operator of the vehicle;
    a conduit for conveying collected pieces of roadside litter to a storage bin;
    a roadside litter locating system for mapping a location of the pieces of roadside litter in the area proximal to the vehicle, wherein the roadside litter locating system comprises:
        one or more cameras for recording a digital image of the area proximal to the vehicle and
        an image analyser for identifying the pieces of roadside litter in the digital image,
    wherein the image analyser comprises image recognition to recognise one or both of: predefined pieces of roadside litter, and predefined objects which are expected to be found in the area proximal to the vehicle.

2. The vehicle of claim 1, wherein movement of the arm is automatically controlled by the roadside litter locating system.

3. The vehicle of claim 1, wherein the arm is slidably coupled to the vehicle.

4. The vehicle of claim 1, wherein the arm is rotatably coupled to the vehicle.

5. The vehicle of claim 1, wherein the arm is located at a front of the vehicle and adapted to collect the pieces of roadside litter from an area proximal to the front of the vehicle.

6. The vehicle of claim 1, wherein the collector comprises one or more roadside litter collecting members, each roadside litter collecting member being configured for collecting different pieces of roadside litter.

7. The vehicle of claim 1, wherein the collector comprises roadside litter clamping members that are configured to clamp and retain the pieces of roadside litter therebetween.

8. The vehicle of claim 1, wherein the arm is configured to move between the roadside litter collecting position and a litter disposing position, the vehicle further comprising:
    a receptacle configured to receive pieces of roadside litter dropped by the collector when the arm is in the litter disposing position.

9. The vehicle of claim 8, wherein the receptacle is at a front of the vehicle.

10. The vehicle of claim 8, wherein the receptacle comprises a hopper.

11. The vehicle of claim 8, wherein the conduit comprises a conveyor for conveying the pieces of roadside litter from the receptacle to the storage bin.

12. The vehicle of claim 1, wherein the conduit is located underneath the vehicle.

13. The vehicle of claim 1, wherein the storage bin is defined by a container on a trailer adapted to be towed behind the vehicle.

14. The vehicle of claim 1, further comprising a second arm that is moveable between a roadside litter collecting position and a litter disposing position,
    wherein pieces of roadside litter dropped by the second arm when in the litter disposing position are received at an inlet of the storage bin.

15. The vehicle of claim 14, wherein the second arm is at an opposite side of the vehicle to the arm.

16. A trailer adapted to be towed behind the vehicle of claim 1, the trailer comprising:
    an inlet adapted to receive pieces of roadside litter conveyed by the conduit; and
    a storage portion for storing the litter.

* * * * *